3,015,029
GAMMA RAY SOURCE WITH LITHIUM TARGET
Paul E. Baker, Anaheim, Calif., assignor to California Research Corporation, San Francisco, Calif., a corporation of Delaware
Filed June 19, 1957, Ser. No. 666,538
4 Claims. (Cl. 250—83.3)

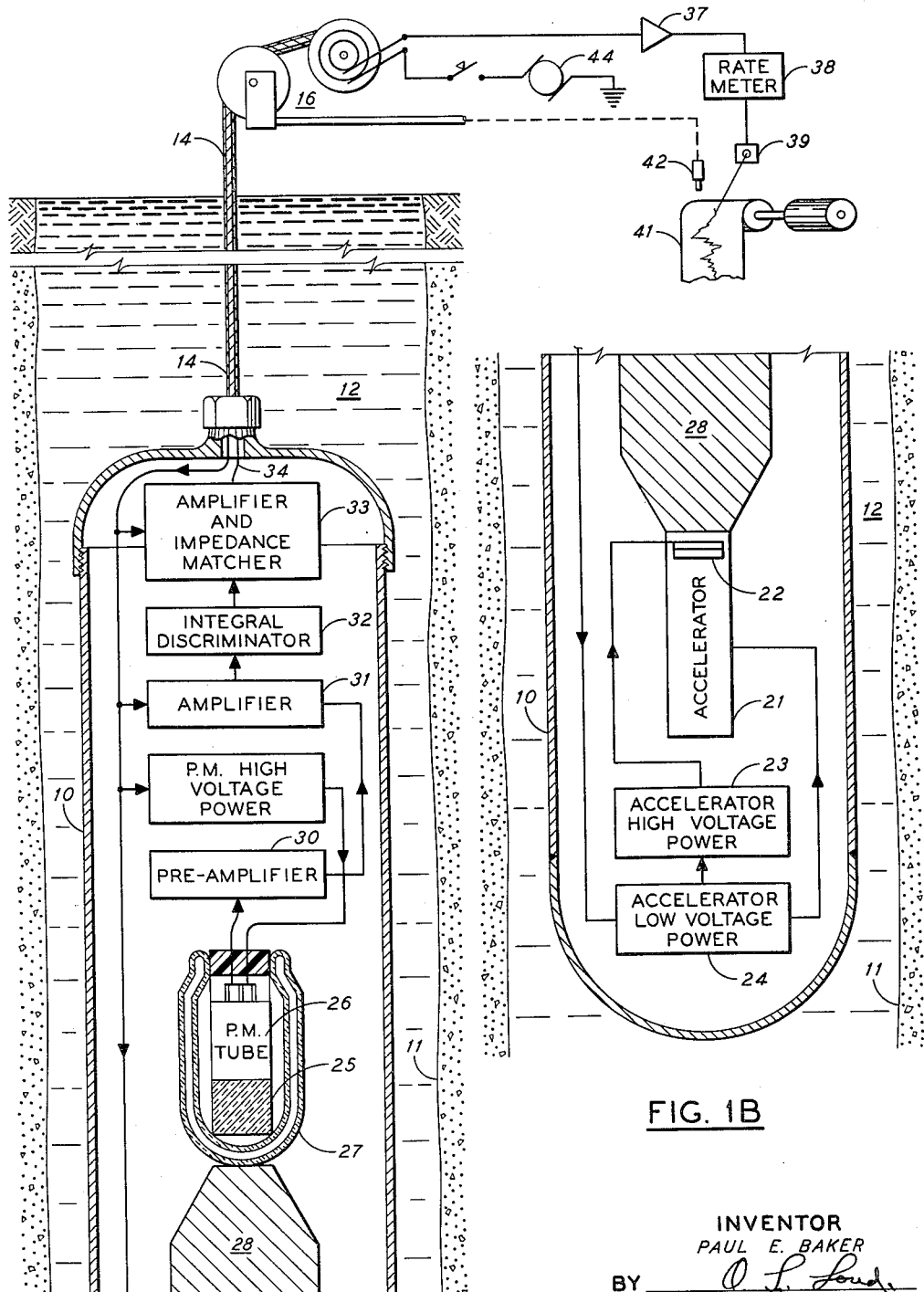

This invention relates to the art of radioactivity or nuclear well logging. In particular it relates to the bombardment of subsurface formations with high energy X-rays or gamma rays, and more particularly to the production of high energy X-rays or gamma rays for the purpose of such bombardment.

It is now well known in the art of well logging to subject earth formations to bombardment by various nuclear radiations. In certain kinds of nuclear logging, formations are bombarded by radiation from a radium-beryllium mixture which serves as a source of both neutrons and gamma rays. In other kinds of logging, a polonium-beryllium mixture is used, which produces neutrons accompanied by a smaller proportion of gamma rays than is emitted from the radium-beryllium mixture. When gamma rays only are desired, it has been customary to use a source comprising radioactive cobalt or radioactive cesium. The gamma rays from cobalt and cesium have quantum energies of the order of one million electron volts, and such energies have proved quite adequate for many logging purposes. But there are some purposes for which they are wholly inadequate.

One such purpose is the logging of carbon concentration by means of the elastic scattering of 15 million electron volt gamma rays or X-rays. In the following discussion, the term gamma rays has been used to include other forms of electromagnetic radiation, such as X-rays, which interact with carbon and other material by identical processes and which are separately designated only to indicate their source of origin. The logging method itself is described in a copending application by S. B. Jones, Serial No. 671,469, assigned to the same assignee as this application. Briefly, this method is based on the unique reaction of carbon nuclei to gamma rays of an energy of 15.09 mev. Gamma rays of this energy are elastically back-scattered, with substantially the same energy, by collision with carbon nuclei, so that measurement of the amount of 15 mev. back-scattered gamma rays after bombardment of a formation with 15 mev. gamma rays provides an indication of the concentration of carbon in the logged formation.

This Jones method is particularly useful in logging because these gamma rays penetrate many feet into a non-carbonaceous rock formation, since their absorption length is of the order of a foot for non-carbonaceous materials. On the other hand, the absorption length in carbon or graphite for gamma rays having energies equal to the energy of the 15.09 mev. energy level of the carbon nucleus is only about one-half inch, because the carbon nucleus has an exceedingly large probability of elastically scattering gamma rays of this energy. In fact, the cross-section of a carbon nucleus for this scattering process is about 30 barns, whereas the cross-section for other nuclei that display elastic scattering of gamma rays in this energy region is only of the order of 1 to 10 millibarns. Thus, in view of this substantial disparity between the probabilities of elastic scattering of gamma rays of this energy level by the carbon nucleus and by other nuclei, the presence in the borehole of appreciable quantities of elastically scattered gamma rays at this energy level provides a reliable indication of the presence in the bombarded formation of appreciable amounts of carbon. This large scattering probability for carbon, however, is confined to gamma rays having energies in the region of 15.09 mev. since the cross-section of carbon for gamma rays of energies above and below 15.09 mev. is very small.

The gamma rays which are elastically scattered by the carbon nuclei have nearly their full original energy, even if they are scattered directly backward. Hence, they retain their extreme penetrating power in rock formations even if they are scattered backward toward the borehole where they can be detected. Thus, oil two or three feet into the rock behind the zone invaded by filtrate from the drilling fluid can be detected. Even if the drilling fluid invasion is unusually deep, signals can still be obtained from this invaded zone, because in nearly all instances some residual oil saturation of a few percent at least is found in the invaded zone.

Radiation from scattering of the original gamma ray beam by electrons will be primarily directed outwardly into the rock formation, and radiation that is scattered directly backward as a result of electron scattering will have an energy of one mev. or less. Similarly, any radiation which is back-scattered from nuclei other than those of carbon will have intensities 100 times or so less than that from carbon, and no nuclei other than carbon will back-scatter radiation with an energy of approximately 15.09 mev. Thus, through the use of suitable energy discriminators and/or radiation shields in the detection circuit, only radiation having energies in the desired spectrum will be converted into the resultant signal.

To produce the above-described highly characteristic reaction between gamma rays and carbon nuclei, it is necessary, in the first place, to generate gamma rays having quantum energies of at least 15.09 million electron volts. None of the sources customarily used produces energies that are even comparable. I have discovered that gamma rays of as high energy as those required in the carbon logging process, namely an energy of at least 15.09 mev., can be produced in a particular kind of downhole source in which a lithium target is bombarded with protons, some of which protons have an energy of 441 kev. (thousand electron volts). This bombardment produces gamma rays from the reaction $Li^7(p)Be^8$. Some of these emitted gamma rays have a sharply defined energy level at 17.6 mev. and others of the gamma rays have a more diffuse energy level centered at approximately 14.8 mev. and extending for 1 mev. on either side of this center. The gamma rays of both of the above energy levels are useful in the present invention. The gamma rays of 17.6 mev. energy emitted by the lithium target enter the formation, and some of them are Compton-scattered therein to produce a continuous energy spectrum which includes some gamma rays of substantially 15 mev. Some of these 15 mev. gamma rays which are produced by Compton scattering will then be elastically back-scattered by collisions with carbon nuclei, while retaining substantially their 15 mev. energy level, and their detection provides an indication of the carbon concentration in the logged formation. Similarly, some of the gamma rays emitted by the lithium target with an energy level centered at 14.8 mev. and extending to 15.8 mev., will be elastically back-scattered at 15 mev. by carbon nuclei, since gamma rays of 15 mev. are included in this broad line.

It is an object of this invention to provide, for well logging purposes, an improved downhole source of high energy gamma rays having an energy of at least 15.09 mev.

It is an additional object of the present invention to provide methods and apparatus for logging subterranean formations for their carbon content by introducing into the formation gamma rays of a predetermined energy level produced by bombarding lithium with a stream of protons.

Additional objects and advantages of the present invention will be apparent from the following description when read in connection with the accompanying drawing, in which:

FIG. 1A illustrates the disposition in a representative borehole of the radiation detection portion of a logging sonde according to the present invention, together with the associated surface equipment; and FIG. 1B is a continuation of FIG. 1A and illustrates the gamma ray generating portion of the sonde.

Referring to the drawing, numeral 10 designates a sonde adapted to be lowered into a borehole 12 to log a formation 11. Sonde 10 is suspended in borehole 12 by a cable 14 which extends to the surface of the earth over a suitable sheave and winch 16. The winch is provided with a commutating arrangement for conveying the logging signal transmitted through cable 14 to suitable amplifying and recording equipment to be described more in detail below. Protons of the required energy are produced in a proton accelerator 21 which has at one end thereof a lithium target 22 at which the protons are directed. Accelerator 21 may be of any suitable type, such as a Cockroft-Walton generator or a Van de Graaff generator. Power is supplied to accelerator 21 from a high voltage power supply 23 and a low voltage power supply 24.

The above-described reaction for creating gamma rays can be produced by protons having a fairly wide energy level, but the reaction has a sharp resonance when the protons have an energy of 441 kev. and accordingly, protons of this energy are preferably generated in accelerator 21. The elastically back-scattered gamma rays in formation 11 are detected by suitable means such as an ionization chamber, or, as shown, a scintillation counter comprising a scintillation crystal 25 and a photomultiplier tube 26. This counter is disposed in a Dewar flask 27 for thermal insulation. The detector is shielded from accelerator 21 by shielding material 28.

The output signal from photomultiplier 26 is supplied through a preamplifier 30 to an amplifier 31 and thence to a discriminator 32 which discriminates against signals resulting from radiation having an energy appreciably less than 15 mev. The output signal from discriminator 32 is supplied through an amplifier and impedance matching network 33 to a conductor 34 for transmission to the surface recording equipment. Although discriminator 32 is shown disposed in the logging sonde, it will be understood that it could be located at the earth's surface, if desired. At the surface the signal is amplified by an amplifier 37 and supplied through a rate meter 38 to a recorder 39 which records on a chart 41. The depth of sonde 10 in the borehole is indicated by a depth marker 42 which prints suitable depth indicia on chart 41. Power is supplied to the surface recording equipment and to the sonde from a source 44.

The operation of the illustrated embodiment is as follows: With sonde 10 in position adjacent the formation to be logged, the components of the sonde are energized to produce in accelerator 21 a beam of protons, preferably having an energy of 441±6 kev., directed at lithium target 22. This bombardment of target 22 by the proton beam produces emission of gamma rays having an energy of 17.6 mev. and gamma rays having an energy centered at 14.8 mev. The intensity of emission is not uniform with angle of emission, but the anisotropy is not strong enough to be an important factor. The gamma rays enter the formation 11 and, with respect to the 17.6 mev. gamma rays, the Compton scattering thereof changes the line spectrum to a continuous spectrum, which spectrum includes gamma rays having an energy of 15 mev. Similarly, the gamma rays emitted by target 22 having an energy centered at 14.8 mev. and extending for 1 mev. on either side of this center will enter the formation and be back-scattered by carbon nuclei.

Shield 28 prevents gamma rays from reaching the detector directly from the accelerator and lithium target. Gamma rays can only reach the detector after Compton scattering or after elastic scattering from carbon. The shape of shield 28, which may be made of lead, bismuth, uranium-238 or other heavy material is such that the scattering angle of gamma rays reaching the detector must be at least 10 degrees. If a gamma ray originally has an energy of 17.6 mev., its energy after scattering through 10° is 11.6 mev. Thus, the highest energy gamma ray reaching the detector through Compton scattering has an energy of 11.6 mev. The gamma rays elastically scattered from carbon have an energy of 15.09 mev. Hence, no gamma rays of energy between about 12 and about 15 mev. are detected, and, in the absence of carbon, no gamma rays above 12 mev. are detected. Integral discriminator 32 is such that it passes to the counting and recording mechanisms only pulses of amplitude corresponding to gamma rays of energy above about 14 mev., so that all of these pulses must represent actually gamma rays of 15.09 mev., scattered from carbon.

The gamma rays emerging from formation 11 after being elastically scattered by carbon nuclei will have an energy slightly less than that of the original gamma radiation, since the carbon nucleus does absorb a small amount of energy in recoiling, but this energy loss is only of the order of 10,000 electron volts, or .01 mev., so that its effect is negligible in the present invention. The elastically back-scattered radiation has an energy band-width of only 20 or 30 kev., so that identification of the detected back-scattered energy is facilitated. Hence, the energy measured in the detection circuit is a measure of the carbon content of the logged formation.

I claim:

1. Apparatus for detecting the presence of carbon in a subterranean formation of unknown composition penetrated by a borehole, comprising a gamma ray generator including a source of protons, a proton accelerating chamber for accelerating a stream of protons from said source to an energy of approximately 441 kev., and a lithium-7 target disposed at one end of said generator in the path of said stream of protons, whereby said lithium-7 target emits gamma rays into said formation having energies of at least 15 mev. when struck by said protons, said gamma rays of an energy of 15 mev. being subject to elastic scattering by the nuclei of carbon in said formation, means for detecting radiation from said formation in said borehole, means for separating from said detected radiation elastically back scattered gamma rays having energies of approximately 15 mev. as a measure of the presence of carbon in said formation, and means for recording said gamma rays in accordance with the depth of said apparatus in said borehole.

2. Apparatus for detecting the presence of carbon in a subterranean formation of unknown composition penetrated by a well bore, comprising a gamma ray generator including a source of protons, a proton accelerating chamber for accelerating a stream of protons from said source to an energy of approximately 441 kev., and a lithium-7 target disposed at one end of said chamber in the path of said stream of protons, whereby said lithium-7 target emits gamma rays into said formation having energies of at least 15 mev. when struck by said protons, said gamma rays of an energy of 15 mev. being subject to elastic scattering by the nuclei of carbon in said formation, detection means for detecting in said well bore at least a portion of said back-scattered gamma rays having energies of about 15 mev., gamma ray scattering means positioned between said generator and said detection means for shielding said detection means from incident gamma rays originating in said lithium target, the geometry of said scattering means, said detection means and said lithium target being such that gamma rays reaching said detection means from said target must have been scattered through at least a minimum angle of about 10 degrees, and means for indicating the number of such gamma rays having energies of about 15 mev., as a measure of the presence of carbon in said formation, and means for recording said number of gamma rays in accordance with the depth of said apparatus in said well bore.

3. Apparatus for detecting the presence of carbon in an earth formation penetrated by a well bore comprising means for generating a stream of protons in said well bore, means for accelerating said protons to an energy primarily in the region of 441 kev., means for directing said stream of protons at a lithium-7 containing target in said well bore to cause said target to emit a substantial number of gamma rays having an energy of at least 15 mev., means for directing said gamma rays of approximately 15 mev. into said formation to subject them to elastic scattering by the nuclei of carbon in said formation, detecting means positioned adjacent to said formation, shielding means for said detector to exclude from said detector direct radiation by said gamma rays originating in said lithium-7 target, said detecting means being responsive to at least a portion of said elastically scattered gamma rays which have an energy of approximately 15 mev., means for indicating the number of said detected gamma rays having energies of about 15 mev. as a measure of the presence of carbon in said formation, and means for recording said detected gamma rays in accordance with the depth of said detector along said well bore.

4. Apparatus for detecting the presence of carbon in an earth formation penetrated by a well bore comprising means for generating a stream of protons in said well bore, means for accelerating said protons to an energy primarily in the region of 441 kev., means for directing said stream of protons at a lithium-7 containing target to cause said target to emit simultaneously gamma rays having energies of 15 mev. and 17 mev., means for directing said emitted gamma rays into said formation to cause Compton-scattering of some of said 17 mev. gamma rays for producing a continuum of additional gamma rays that include energies through approximately 15 mev., such gamma rays of approximately 15 mev. being subject to elastic scattering without substantial degradation in energy by the nuclei of said carbon, means for detecting in said well bore at least a portion of said elastically scattered gamma rays which have an energy of approximately 15 mev. as a measure of the presence of carbon in said formation, and means for indicating the number of such detected gamma rays having energies of about 15 mev. as a measure of the presence of carbon in said formation and in accordance with the depth of said detector along the well bore.

References Cited in the file of this patent

UNITED STATES PATENTS

| | | |
|---|---|---|
| 2,648,780 | Herzog | Aug. 11, 1953 |
| 2,659,011 | Youmans et al. | Nov. 10, 1953 |
| 2,727,155 | Herzog et al. | Dec. 13, 1955 |
| 2,752,504 | McKay | June 26, 1956 |
| 2,769,096 | Frey | Oct. 30, 1956 |

OTHER REFERENCES

The Elastic Scattering of Protons by Lithium, by Warters et al. from The Physical Review, vol. 91, No. 4, Aug. 15, 1953, pp. 917–921.